US012436902B2

(12) United States Patent
Kumbla et al.

(10) Patent No.: US 12,436,902 B2
(45) Date of Patent: Oct. 7, 2025

(54) MEMORY REGISTRATION FOR REMOTE DIRECT MEMORY ACCESS (71) Applicant: Hewlett Packard Enterprise Development LP, Spring, TX (US)

(72) Inventors: Gautham Bhat Kumbla, Karnataka (IN); Mashood Abdulla Kodavanji, Karnataka (IN); Sharad Singhal, Belmont, CA (US); Ramya Ahobala Rao, Karnataka (IN); Chinmay Ghosh, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 30 days.

(21) Appl. No.: 18/631,605

(22) Filed: Apr. 10, 2024

(65) Prior Publication Data
US 2025/0252066 A1 Aug. 7, 2025

(30) Foreign Application Priority Data

Feb. 7, 2024 (IN) .............................. 202411008293

(51) Int. Cl.
*G06F 13/16* (2006.01)
*G06F 12/02* (2006.01)
*G06F 15/173* (2006.01)

(52) U.S. Cl.
CPC ...... *G06F 13/1663* (2013.01); *G06F 12/0253* (2013.01); *G06F 15/17331* (2013.01)

(58) Field of Classification Search
CPC .. G06F 13/1663; G06F 13/28; G06F 12/0253; G06F 15/17331; G06F 3/0655; G06F 3/0604; G06F 3/0659; G06F 3/067
See application file for complete search history.

(56) References Cited

U.S. PATENT DOCUMENTS

| 2015/0039712 | A1* | 2/2015 | Frank | G06F 15/167 709/212 |
| 2022/0206852 | A1* | 6/2022 | Venkataramani | G06F 9/52 |
| 2022/0413743 | A1* | 12/2022 | Neverovitch | G06F 3/0655 |

OTHER PUBLICATIONS

De Sensi et al., An In-Depth Analysis of the Slingshot Interconnect, Aug. 20, 2020 (13 pages).
Github, "Libfabric Programmer's Manual", available online at <https://ofiwg.github.io/libfabric/v1.9.1/man/fi_trigger.3.html>, 2023, 4 pages.
Github, "OpenFAM: A library for programming Fabric-Attached Memory", available online at <https://openfam.github.io/index.html>, 2021, 4 pages.
Wikipedia, "Remote direct memory access", available online at <https://en.wikipedia.org/w/index.php?title=Remote_direct_memory_access&oldid=1093871583>, Jun. 19, 2022, 3 pages.

* cited by examiner

*Primary Examiner* — Tracy C Chan
(74) *Attorney, Agent, or Firm* — Hewlett Packard Enterprise Patent Department (57) ABSTRACT Unused memory registrations in a remote memory system are proactively identified and freed. A memory server maintains a list of resource tracking entries for its outstanding memory registrations. The memory server continually monitors its list of resource tracking entities. When the memory server finds an unused memory registration in its list, it unregisters the corresponding shared memory region. The monitoring may be performed in the background of the memory server by, e.g., a monitor thread. As a result, unused memory registrations may be quickly released.

20 Claims, 9 Drawing Sheets

Create memory registration by registering shared memory region of memory server with network interface card of memory server. 802

↓

Store resource tracking entry for memory registration in tracking memory region of memory server. 804

↓

Send memory registration information to compute node. 806

MEMORY REGISTRATION FOR REMOTE DIRECT MEMORY ACCESS

GOVERNMENT RIGHTS

This invention was made with Government support under Contract Number H98230-15-D-0022/0003 awarded by the Maryland Procurement Office. The Government has certain rights in this invention.

BACKGROUND

Remote Direct Memory Access (RDMA) is a networking technology designed to enhance data transfer efficiency and reduce latency in computing environments. RDMA enables direct memory access between networked devices without involving processors of the devices, allowing for high-throughput and low-latency communication between the devices. This approach streamlines data transfers by off-loading data movement tasks from the processors to specialized RDMA-enabled network adapters. By facilitating direct communication between the memories of networked devices, RDMA may accelerate data-intensive applications, such as high-performance computing, cloud computing, and storage systems.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the present disclosure and are not necessarily drawn to scale.

DETAILED DESCRIPTION

The present disclosure provides many different examples for implementing different features. Specific examples of components and arrangements are described below to simplify the present disclosure. These are, of course, merely examples and are not intended to be limiting.

High-performance computing (HPC) environments may utilize a client-server architecture. A remote memory system (or disaggregated memory system) may be implemented in a client-server HPC environment using memory servers that are globally accessible (within a network). The memory servers may provide remote memory that can be shared by compute nodes. The memory servers are attached directly to a high-speed network fabric that links both the compute nodes and the memory servers. Applications may create shared memory regions in the memory servers, and compute nodes may access those shared memory regions using RDMA.

In RDMA, prior to memory access at a memory server, memory regions are registered with a network interface card (NIC) of the memory server. When an HPC environment includes a large quantity of compute nodes, the quantity of memory registrations in the HPC environment may be large, particularly for HPC computations with large memory requirements. An excess quantity of memory registrations may impact the performance and scalability of the remote memory system. Additionally, some network fabrics may limit the total quantity of supported memory registrations, which may limit the amount of memory accessible by the compute nodes.

The present disclosure describes a technique for efficiently freeing unused memory registrations in a remote memory system. A memory server maintains a list of resource tracking entries for its outstanding memory registrations. The resource tracking entries are stored in a predefined memory region. When a compute node requests information for a memory registration, the memory server provides a key for the memory registration to the compute node, and also provides a location of the resource tracking entry to the compute node. The compute node may use the key to access a shared memory region at the memory server via RDMA operations.

A resource tracking entry for a memory registration includes a status of the memory registration and a global reference count for the memory registration. The global reference count indicates the quantity of compute nodes (within the network) that are actively using the memory registration. The status may indicate whether the memory registration is active, ready-to-release, or inactive.

When a compute node is ready to release a memory registration, it directly updates the corresponding resource tracking entry, on the memory server, via RDMA operation (s). For example, the compute node may perform an atomic compare-and-exchange operation, at the location of the resource tracking entity on the memory server. Accordingly, the compute node directly and atomically updates the global reference count and status for the memory registration. Advantageously, this allows the global reference count and status for the memory registration to be synchronized across the compute nodes without degrading memory server performance or raising concurrent access challenges. For example, directly and atomically updating a resource tracking entry (from a compute node) may be faster and more reliable than updating the resource tracking entry by a remote operation at the memory server.

A memory server continually monitors its list of resource tracking entities for memory registrations. Specifically, the memory server searches the list for unused memory registrations, based on their global reference counts and/or statuses. When the memory server finds an unused memory registration in its list, it unregisters the corresponding shared memory region. The monitoring may be performed in the background of the memory server by, e.g., a monitor thread. As a result, unused memory registrations may be quickly released, thereby reducing the quantity of memory registrations in the remote memory system. By quickly reducing the amount of memory registrations, the performance of the remote memory system may be improved.

Figure 1:
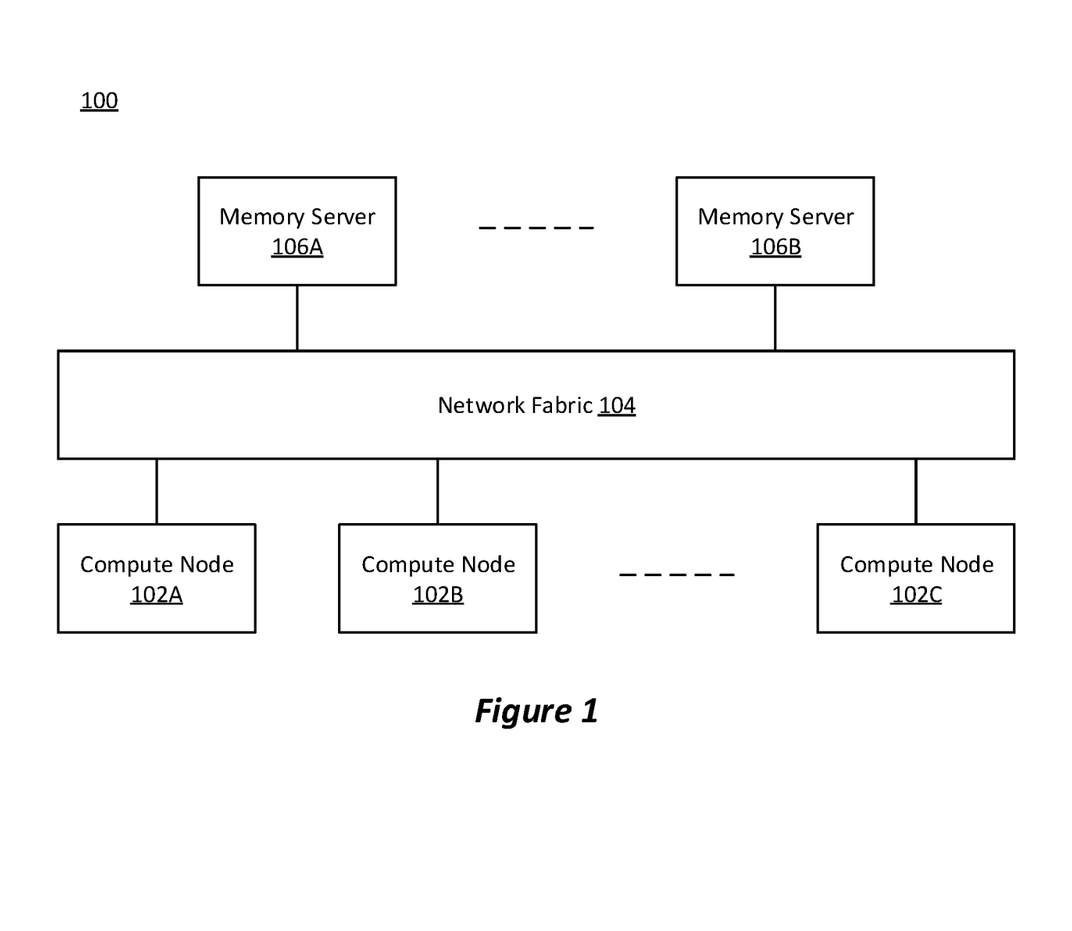
FIG. 1 is a block diagram of a remote memory system, according to some implementations.

FIG. 1 is a block diagram of a remote memory system 100, according to some implementations. The remote memory system 100 may be part of a computing environment, such as an HPC environment, that utilizes a client-server architecture. The remote memory system 100 includes multiple compute nodes 102 (including compute nodes 102A, 102B, and 102C), a network fabric 104, and one or more memory servers 106 (including memory servers 106A and 106B).

The compute nodes 102 work together to perform HPC computations. For example, a task may be divided into smaller segments that may be parallelized across the compute nodes 102. Application(s) may be run on the compute nodes 102 in order to perform the HPC computations. The compute nodes 102 may be standalone units equipped with processors, memories, and the like (subsequently described).

The network fabric 104 facilitates the coordination and synchronization of the compute nodes 102 when performing HPC computations. The network fabric 104 may include routers, switches, links, and the like. The components of the network fabric 104 work together to provide a high-bandwidth interconnection between the compute nodes 102 and the memory servers 106. The design of the network fabric 104 may prioritize low latency and high throughput among the connected components. For example, the network fabric 104 may be based on a technology such as InfiniBand, Slingshot, or the like.

The memory servers 106 provide remote memory that can be shared by the compute nodes 102. HPC computations may have large memory requirements, which may exceed the memory capacity of the compute nodes 102. The compute nodes 102 may access shared memory of the memory servers 106, and use that shared memory to perform HPC computations. The memory servers 106 may be part of a remote memory system for the compute nodes 102, such as a Fabric Attached Memory (FAM). An example implementation of a FAM is OpenFAM. RDMA may be used, by the compute nodes 102, to access the shared memory of the memory servers 106 in a manner that meets the high throughput and low latency requirements of the computing environment.

Figure 2:
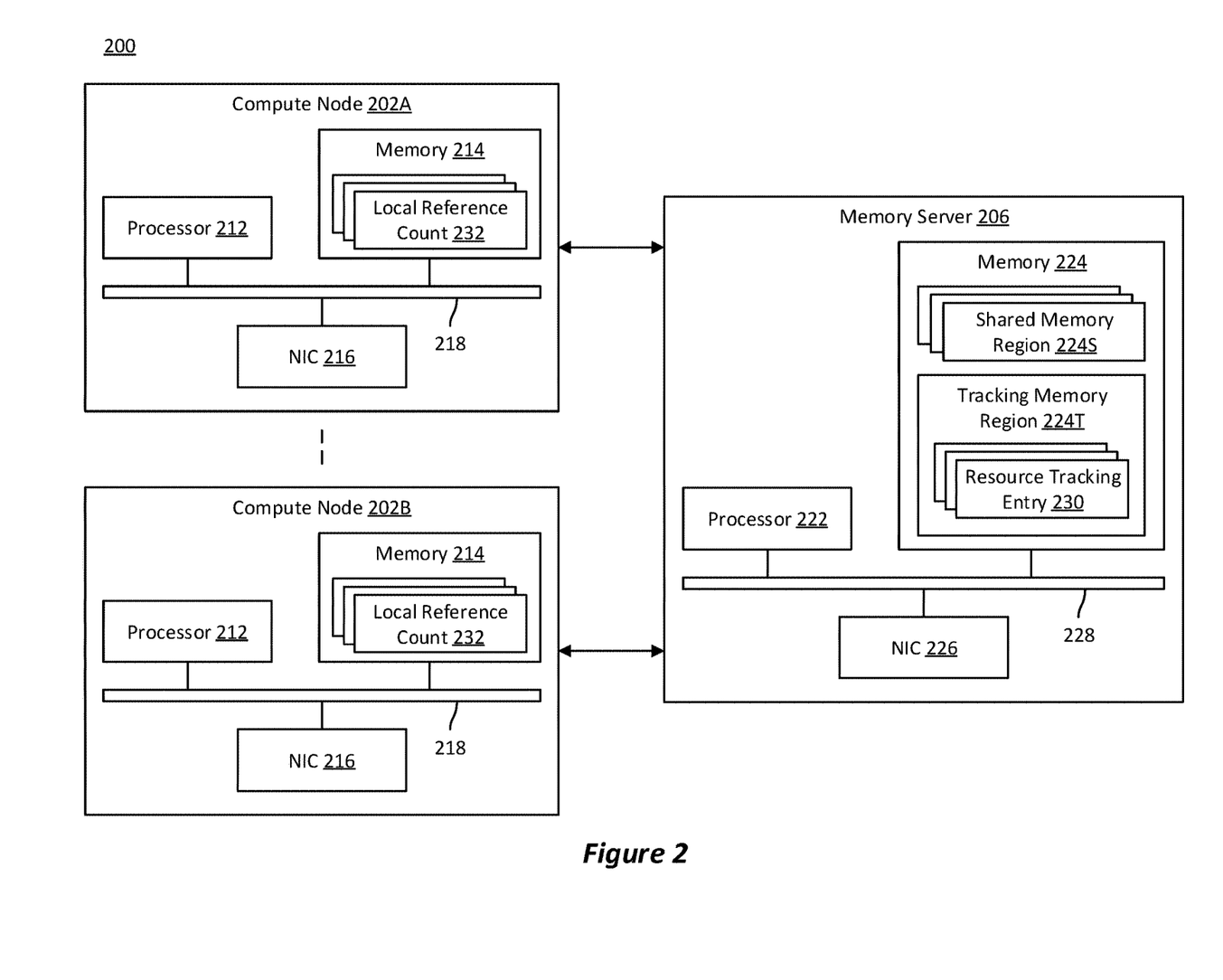
FIG. 2 is a block diagram of a remote memory system, according to some implementations.

FIG. 2 is a block diagram of a remote memory system 200, according to some implementations. The remote memory system 200 is an example implementation of the remote memory system 100 previously described for FIG. 1. Additional details of the remote memory system 200, including details of compute nodes 202 (including compute nodes 202A and 202B) and a memory server 206, are shown. Only one memory server 206 is shown for illustration clarity.

Each compute node 202 includes various hardware components. These hardware components may include a processor 212, a memory 214, and a network interface card (NIC) 216. The hardware components may be interconnected through a number of busses and/or network connections. In one example, the processor 212, the memory 214, and the NIC 216 may be communicatively coupled via a bus 218, such as a PCI-Express bus.

The processor 212 retrieves executable code from the memory 214 and executes the executable code. The executable code may, when executed by the processor 212, cause the processor 212 to implement any functionality described herein. The processor 212 may be a microprocessor, an application-specific integrated circuit, a microcontroller, or the like.

The memory 214 may include various types of memory, including volatile and nonvolatile memory. For example, the memory 214 may include Random-Access Memory (RAM), Read-Only Memory (ROM), a Hard Disk Drive (HDD), and/or the like. Different types of memory may be used for different data storage needs. For example, the processor 212 may boot from ROM, maintain nonvolatile storage in an HDD, execute program code stored in RAM, and store data under processing in RAM. The memory 214 may include a non-transitory computer readable medium that stores instructions for execution by the processor 212. One or more modules within the compute node 202 may be partially or wholly embodied as software and/or hardware for performing any functionality described herein.

The NIC 216 may be used to connect to a network (e.g., LAN, WAN, etc.) and communicate with other devices over that network. The NIC 216 facilitates the transmission and reception of data packets between the compute node 202 and the network, and may adhere to one or more networking standards such as Ethernet, Wi-Fi, and the like. Additionally, the NIC 216 supports RDMA, which allows for direct memory access from one compute node 202 to another host (e.g., compute node 202 or memory server 206) without involving the processor 212, which may reduce latency and processing overhead. The NIC 216 may utilize one or more RDMA-capable protocols, such as iWARP or RDMA over Converged Ethernet (RoCE), to facilitate high-speed and low-latency data transfers between hosts. By offloading data access tasks from the processor 212 to the NIC 216, the network performance of the compute node 202 may be improved, which may be particularly advantageous for HPC applications.

The memory server 206 includes various hardware components. These hardware components may include a processor 222, a memory 224, and a NIC 226. The hardware components may be interconnected through a number of busses and/or network connections. In one example, the processor 222, the memory 224, and the NIC 226 may be communicatively coupled via a bus 228, such as a PCI-Express bus.

The processor 222 retrieves executable code from the memory 224 and executes the executable code. The executable code may, when executed by the processor 222, cause the processor 222 to implement any functionality described herein. The processor 222 may be a microprocessor, an application-specific integrated circuit, a microcontroller, or the like.

The memory 224 may include various types of memory, including volatile and nonvolatile memory. For example, the memory 224 may include RAM, ROM, a HDD, and/or the like. Different types of memory may be used for different data storage needs. For example, the processor 222 may boot from ROM, maintain nonvolatile storage in an HDD, execute program code stored in RAM, and store data under processing in RAM. The memory 224 may include a non-transitory computer readable medium that stores instructions for execution by the processor 222. One or more modules within the memory server 206 may be partially or wholly embodied as software and/or hardware for performing any functionality described herein.

The NIC 226 may be used to connect to a network (e.g., LAN, WAN, etc.) and communicate with other devices over that network. The NIC 226 facilitates the transmission and reception of data packets between the memory server 206 and the network, and may adhere to one or more networking standards such as Ethernet, Wi-Fi, and the like. Additionally, the NIC 226 supports RDMA, which allows for direct memory access from the memory server 206 to another host (e.g., compute node 202 or memory server 206) without involving the processor 222, which may reduce latency and processing overhead. The NIC 226 may utilize one or more RDMA-capable protocols, such as iWARP or RoCE, to facilitate high-speed and low-latency data transfers between hosts. By offloading data access tasks from the processor 222 to the NIC 226, the network performance of the memory server 206 may be improved, which may be particularly advantageous for HPC applications.

When using RDMA, a process running on a host may bypass portions of the host's operating system network stack. For example, when a compute node 202 sends data to a memory server 206 via RDMA, the data to be sent may initially be in the memory 214 of the compute node 202. Specifically, the data is in the user space of the memory 214. The data may be copied directly from the user space of the memory 214, to buffers of the NIC 216 of the compute node 202, bypassing the operating system kernel of the compute node 202. The data may then be sent, via the network fabric, to the NIC 226 of the memory server 206. The data may then be copied directly from the buffers of the NIC 226, to the user space of the memory 224 of the memory server 206, bypassing the operating system kernel of the memory server 206. Similarly, when the memory server 206 sends data to a compute node 202 via RDMA, the aforementioned operations may be performed in reverse. By using RDMA, copying of the data from the user space of a memory to the operating system kernel (by a processor) may be avoided, thereby increasing the speed and reducing the latency of data transfers.

In RDMA, prior to memory access, a shared memory region 224S in the memory 224 of the memory server 206 is registered with the NIC 226 of the memory server 206. The shared memory region 224S may be a region of a volatile memory or a region of a non-volatile memory. The shared memory region 224S will be accessed, by the compute nodes 202, using RDMA operations. A registration of a shared memory region 224S may be referred to herein as a "memory registration."

Depending on the architecture of the remote memory system 200, there may be constraints on the quantity of memory registrations. For example, the performance of the remote memory system 200 may be reduced if there are a large quantity of memory registrations, as managing the memory registrations may consume other network fabric or system resources (such as open region files, memory-mapped I/O resources, internal caches, and the like). Additionally or alternatively, some remote memory architectures have a limit on the total quantity of supported memory registrations at a given time. To reduce the quantity of memory registrations in the remote memory system 200, the memory server 206 proactively identifies unused memory registrations, and unregisters the corresponding shared memory regions 224S from the NIC 226.

The memory server 206 maintains a list of resource tracking entries 230 for its outstanding memory registrations of the shared memory regions 224S. The resource tracking entries 230 are stored in a predefined region of the memory 224, specifically, a tracking memory region 224T. The tracking memory region 224T may be registered with the NIC 226 for RDMA, but the tracking memory region 224T may be different than the shared memory regions 224S. For example, the tracking memory region 224T may be an optimized memory region, which has faster access speeds than non-optimized memory regions (e.g., the shared memory regions 224S).

Each resource tracking entry 230 corresponds to an RDMA registration of a shared memory region 224S with the NIC 226. A resource tracking entry 230 includes a status of its memory registration (of the shared memory region 224S) and a global reference count for the memory registration (of the shared memory region 224S). The global reference count indicates the quantity of the compute nodes 202 that are actively using the memory registration. The status indicates whether the memory registration is active, ready-to-release, or inactive. An active status indicates that the memory registration is valid. A ready-to-release status indicates that the memory registration is not being used by any compute nodes 202 and thus the corresponding memory region 224S may be unregistered. An inactive status indicates that the corresponding memory region 224S has been unregistered.

In some implementations, a resource tracking entry 230 for a memory registration includes a binary word, which includes the global reference count and the status. For example, the resource tracking entry 230 may be a 64-bit word. Some bits of the binary word may indicate the global reference count with other bits of the binary word may indicate the status. That is: a first portion of the binary word may indicate the status of the memory registration while a second portion of the binary word may indicate the global reference count for the memory registration. When the resource tracking entry 230 includes a binary word (that includes both the global reference count and the status), the global reference count and the status may be updated together by updating the binary word with an atomic operation (subsequently described).

The memory server 206 continually monitors the resource tracking entries 230. A process of the memory server 206 monitors the list of the resource tracking entries 230 for unused memory registrations. An unused memory registration may be one where the corresponding resource tracking entry 230 has a global reference count of zero and/or has a status of ready-to-release, which indicates the corresponding shared memory region 224S is not being used by any of the compute nodes 202. When the memory server 206 finds an unused memory registration in the list of the resource tracking entries 230, it unregisters the corresponding shared memory region 224S from the NIC 226. The monitoring and unregistering may be performed in the background (by, e.g., a monitor thread) of the memory server 206, which may help reduce the latency observed by the compute nodes 202 when a shared memory region 224S is being unregistered. Thus, the quantity of memory registrations may be reduced without impacting the performance of existing workloads on the compute nodes 202.

When a shared memory region 224S is unregistered, the status of the corresponding resource tracking entry 230 is changed to inactive. Additionally, the memory for the resource tracking entry 230 (e.g., within the tracking memory region 224T) may be deallocated. In some implementations, the resource tracking entry 230 is moved to a garbage collector queue. A process of the memory server 206 may monitor the garbage collector queue, and may deallocate the memory for the resource tracking entries 230 in the garbage collector queue. The deallocation may be performed in the background (by, e.g., a garbage collector thread) of the memory server 206. The process for performing garbage collection may be different than the process for monitoring for unused memory registrations.

When a process of the compute node 202 desires to access a shared memory region 224S of the memory server 206, the compute node 202 requests memory registration information for the shared memory region 224S from the memory server 206. The shared memory region 224S is registered (if it is not already registered) and the corresponding resource tracking entry 230 may be created or updated (such as by incrementing its global reference count and/or changing its status). Information for that memory registration is then sent back to the compute node 202. The memory registration information includes a key for the memory registration of the shared memory region 224S. The compute node 202 may remotely access the shared memory region 224S by performing an RDMA operation (e.g., get or put) using the key. Additionally, the memory registration information includes a location of the corresponding resource tracking entry 230 for the memory registration. The location of the resource tracking entry 230 may be a location (e.g., an offset), within the tracking memory region 224T, where the resource tracking entry 230 is stored. When the compute node 202 no longer desires to access the shared memory region 224S, it releases the shared memory region 224S by remotely updating the corresponding resource tracking entry 230. The global reference count of the resource tracking entry 230 may be decremented and/or the status of the resource tracking entry 230 may be changed. The compute node 202 directly writes new values for those fields of the resource tracking entry 230 to the location (within the tracking memory region 224T) specified by the memory registration information. The compute node 202 may directly update the resource tracking entry 230 by performing an atomic compare-and-exchange operation at the location (within the tracking memory region 224T) specified by the memory registration information. When the resource tracking entry 230 includes a binary word, the compute node 202 may write a new binary word (having an updated global reference count and/or status) to the location within the tracking memory region 224T. Thus, the binary word is overwritten.

The compute node 202 directly updating the resource tracking entry 230 within the tracking memory region 224T of the memory server 206 may be advantageous. The resource tracking entry 230 may remain synchronized across the remote memory system 200. When many compute nodes 202 are accessing the memory server 206, updating the resource tracking entry 230 directly from a compute node 202 may avoid concurrent access challenges that may be raised by other update techniques, such as a remote operation at the memory server 206.

In some implementations, the memory registration information is cached in a local resource cache of a compute node 202. The local resource cache may be stored in the memory 214 of the compute node 202, and may be shared by the processes running on the compute node 202. When a client process of the compute node 202 desires to access a shared memory region 224S of the memory server 206, an agent may first search the local resource cache for the memory registration information. The agent may be part of the client process accessing the shared memory region 224S, or part of a management process for managing the local resource cache. If the memory registration information is available in the local resource cache, then it may be taken directly from the local resource cache and used by the client process. If the memory registration information is unavailable in the local resource cache, then the agent may request it from the memory server 206 (as previously described). Caching the memory registration information on the compute nodes 202 may further optimize the overall performance of the remote memory system 200, such as by avoiding a request storm at the memory server 206.

A compute node 202 may maintain a local reference count 232 for each outstanding memory registration it is using at the memory server 206. A local reference count 232 is a count of how many client processes of the compute node 202 are using the memory registration. When a client process of the compute node 202 starts using a shared memory region 224S, the corresponding local reference count 232 for that memory registration is incremented. When a client process of the compute node 202 stops using a shared memory region 224S, the corresponding local reference count 232 for that memory registration is decremented. The compute node 202 may release the shared memory region 224S (as previously described) when the corresponding local reference count 232 is zero.

Figure 3:
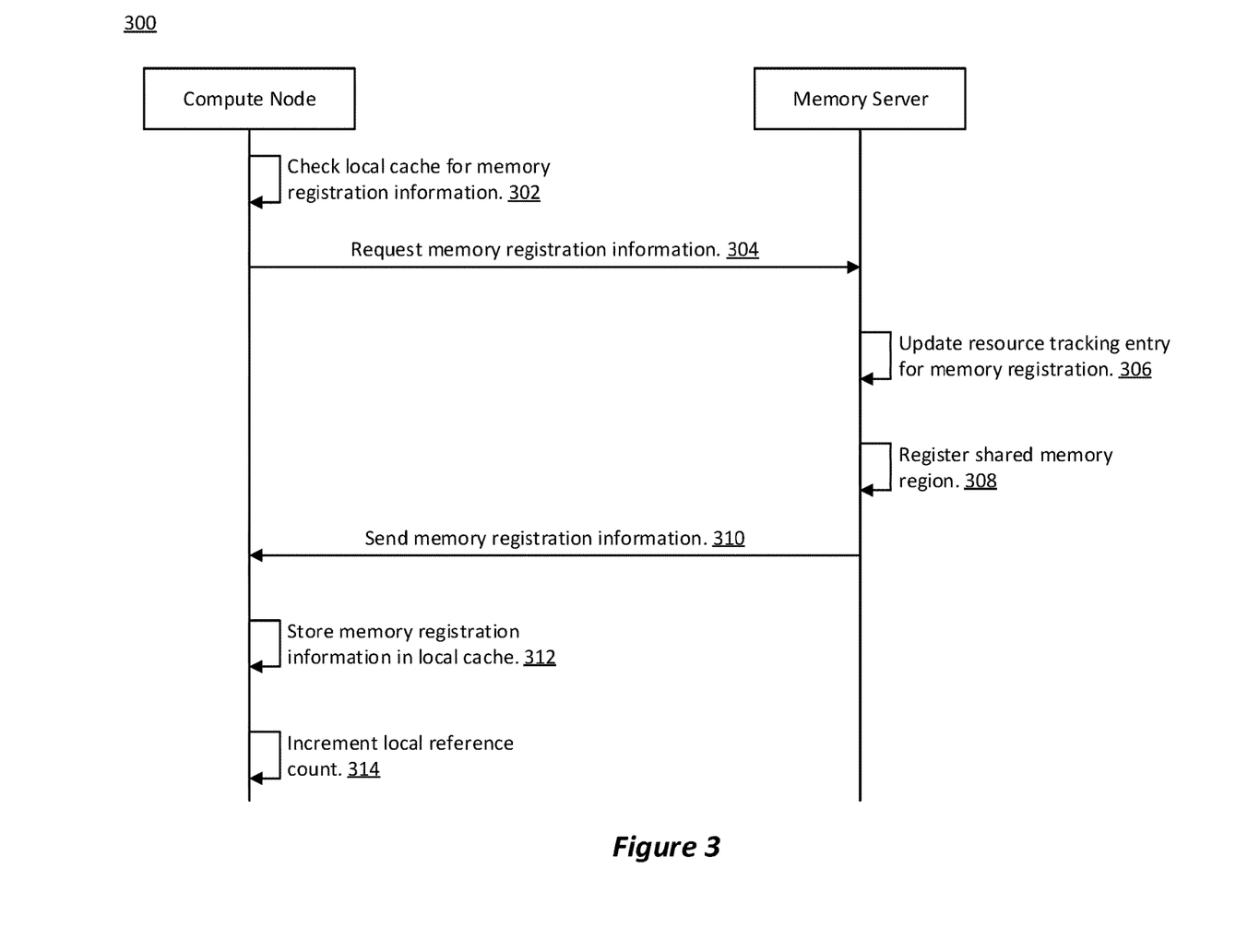
FIG. 3 is a sequence diagram of a memory registration method, according to some implementations.

FIG. 3 is a sequence diagram of a memory sharing method 300, according to some implementations. The memory sharing method 300 may be performed in a remote memory system when a compute node requests memory registration information for a shared memory region of a memory server. The memory registration information may be requested by the compute node when a client process of the compute node desires to access the shared memory region via RDMA.

In step 302, the compute node checks its local resource cache for the memory registration information. If the memory registration information is available in the local resource cache, then it is taken and returned to the client process. Additionally, the local reference count for the memory registration information is incremented. At this point the memory sharing method 300 terminates. If the memory registration information is unavailable in the local resource cache, then steps 304-314 will be performed to request the memory registration information from the memory server.

In step 304, the compute node sends a request for the memory registration information to the memory server. The request may invoke a remote operation at the memory server. For example, the request may be a remote procedure call (RPC) request. The request may include, e.g., an identifier of the desired memory registration.

The memory server checks its list of resource tracking entries for a resource tracking entry that corresponds to the memory registration identified by the request from the compute node. If the corresponding resource tracking entry is found in the list, then step 306 will be performed. If the list does not contain a corresponding resource tracking entry, then step 308 will be performed.

In step 306 (if the desired resource tracking entry exists), the memory server updates the resource tracking entry corresponding to the requested memory registration. The resource tracking entry is updated based on the status of the resource tracking entry. If the resource tracking entry has an status of active, then the global reference count of the resource tracking entry is incremented (by one). If the resource tracking entry has a status of ready-to-release, then status of the resource tracking entry is changed to active and the global reference count of the resource tracking entry is incremented (by one). The resource tracking entry may be updated with an atomic operation, especially when the resource tracking entry includes a binary word that contains both fields of the resource tracking entry.

If the resource tracking entry has a status of inactive, then the resource tracking entry is considered invalid and is replaced with a new resource tracking entry. The shared memory region is registered with the NIC of the memory server, a new resource tracking entry for the memory registration is created, and the new resource tracking entry is added to the list of resource tracking entries. The status of the new resource tracking entry is set to active and the global reference count of the new resource tracking entry is set to one. The memory for the invalid resource tracking entry is deallocated. For example, the invalid resource tracking entry may be moved to a garbage collector queue, which is monitored and processed by another process of the memory server.

In step 308 (if the desired resource tracking entry does not exist), the memory server registers the shared memory region with its NIC. A new resource tracking entry for the memory registration is created and the new resource tracking entry is added to the list of resource tracking entries. The status of the new resource tracking entry is set to active and the global reference count of the new resource tracking entry is set to one. The memory for the new resource tracking entry is allocated from the predefined memory region for the resource tracking entries (e.g., a tracking memory region of the memory server).

In step 310, the memory server sends the memory registration information to the compute node. The memory registration information may be created by the memory server. The memory registration information includes a key for the memory registration, which may be used by the compute node to write to the shared memory region. The memory registration information further includes the location of the resource tracking entry for the memory registration. The location may be an offset within the predefined memory region for the resource tracking entries.

In step 312, the compute node stores the memory registration information in its local resource cache. Thus, the memory registration information may be available to other processes of the compute node in subsequent requests.

In step 314, the compute node increments the local reference count for the memory registration by one. The local reference count may also be stored in the local resource cache of the compute node.

The aforementioned steps for the compute node may be performed by a client process that desires to access the shared memory region of the memory server, or may be performed by a management process of the compute node (which is different from the client process). For example, the local resource cache may be checked by the management process, the memory registration information may be requested by the management process, and the memory registration information may be received by the management process. In that case, the management process may pass the memory registration information to the requesting client process, so that the client process may use the information to access the shared memory region.

Figure 4:
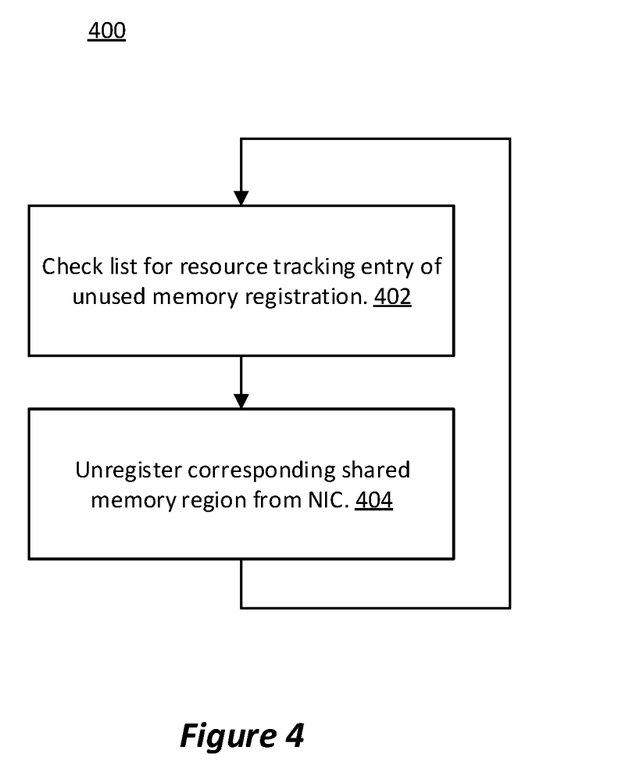
FIG. 4 is a block diagram of a memory registration monitoring method, according to some implementations.

FIG. 4 is a block diagram of a memory registration monitoring method 400, according to some implementations. The memory registration monitoring method 400 may be performed by a process of a memory server. In some implementations, the memory registration monitoring method 400 may be performed in the background (by, e.g., a monitor thread) of the memory server.

The memory server may perform a step 402 of checking its list of resource tracking entries for a resource tracking entry of an unused memory registration. If a resource tracking entry of the list has a status of ready-to-release, then the resource tracking entry may be for an unused memory registration. Additionally or alternatively, if a resource tracking entry of the list has a global reference count of zero, then the resource tracking entry may be for an unused memory registration. Such a memory registration is a candidate for unregisteration.

The memory server may perform a step 404 of unregistering a shared memory region (from the NIC of the memory server). The shared memory region that is unregistered corresponds to the unused memory registration that was identified in step 402. The resource tracking entry for the memory registration may be updated, specifically, by having its status changed to inactive. The memory for the resource tracking entry is then deallocated. For example, the resource tracking entry may be removed from the list of resource tracking entries and moved to a garbage collector queue.

Figure 5:
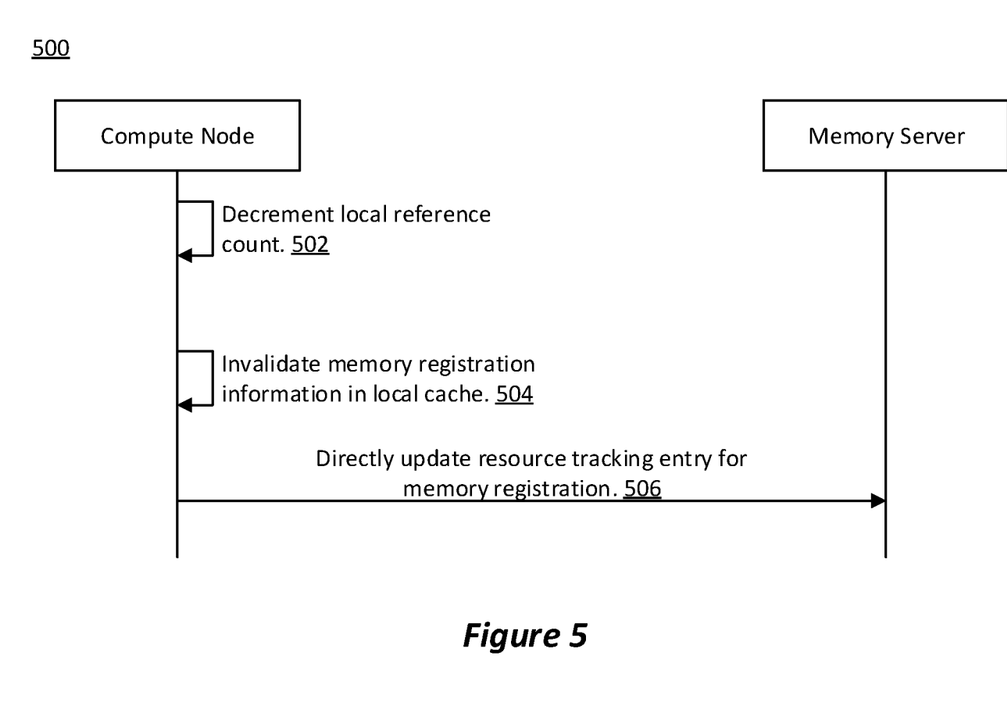
FIG. 5 is a sequence diagram of a memory release method, according to some implementations.

FIG. 5 is a sequence diagram of a memory release method 500, according to some implementations. The memory release method 500 may be performed in a remote memory system when a compute node releases a memory registration of a shared memory region of a memory server. The subsequently described steps for the compute node may be performed by a client process that desires to release the shared memory region of the memory server, or may be performed by a management process of the compute node.

In step 502, the compute node decrements the local reference count for the memory registration by one. The local reference count may be stored in the local resource cache of the compute node. As previously noted, the local reference count is a count of how many client processes of the compute node are using the memory registration. If the local reference count is zero after being decremented, then steps 504 and 506 will be performed.

In step 504, the compute node invalidates the information for the memory registration in its local resource cache. Thus, the memory registration information may no longer be available to other processes of the compute node.

In step 506, the compute node directly updates the resource tracking entry for the memory registration at the memory server. The resource tracking entry is updated via RDMA operation(s). For example, the compute node may perform an atomic compare-and-exchange operation, at the location of the resource tracking entity on the memory server. The location of the resource tracking entry may be a location (e.g., an offset) within a tracking memory region of the memory server. The location of the resource tracking entity is known by the compute node, as it was part of the memory registration information previously received by the compute node during registration of the shared memory region.

The resource tracking entry may only be updated if it has a status of active. If the status of the resource tracking entry is inactive, then the resource tracking entry may not be updated. When the resource tracking entry is updated, the global reference count of the resource tracking entry may be decremented and/or the status of the resource tracking entry may be changed. If the status of the resource tracking entry is active, then the global reference count is decremented by one. Additionally, if the global reference count is (or would be) reduced to zero, then the status of the resource tracking entry is changed to ready-to-release.

Subsequently, a process of the memory server may unregister the shared memory region from the NIC of the memory server (as previously described). Specifically, the shared memory region may be unregistered if, after the resource tracking entity is updated, the memory registration meets the aforementioned criteria for an unused memory registration.

Some variations are contemplated. In some implementations, other types of memory (including non-volatile memory) may be shared. For example, a region of a storage device (e.g., a solid state device (SSD)) may be shared via RDMA. In some implementations, RDMA may be used (instead of RPC) to request memory registration information from the memory server. For example, a resource tracking entry may be directly updated by the client node to increment the global reference count of the resource tracking entry. In some implementations, the health of the compute nodes is tracked by the memory server, such as by tracking the processes running on the compute nodes which are using memory registrations of the memory server. For example, a compute node may periodically send a health update message to the memory server, notifying the memory server that the compute node is healthy. If the memory server detects that a compute node has crashed (e.g., by not receiving a health update message within a certain timeframe), then the memory server updates the resource tracking entries for any memory registrations used by that compute node. Specifically, the global reference counts of any resource tracking entries used by that compute node may be decremented by one and/or the status of the resource tracking entries may be changed to ready-to-release (as previously described).

Figure 6:
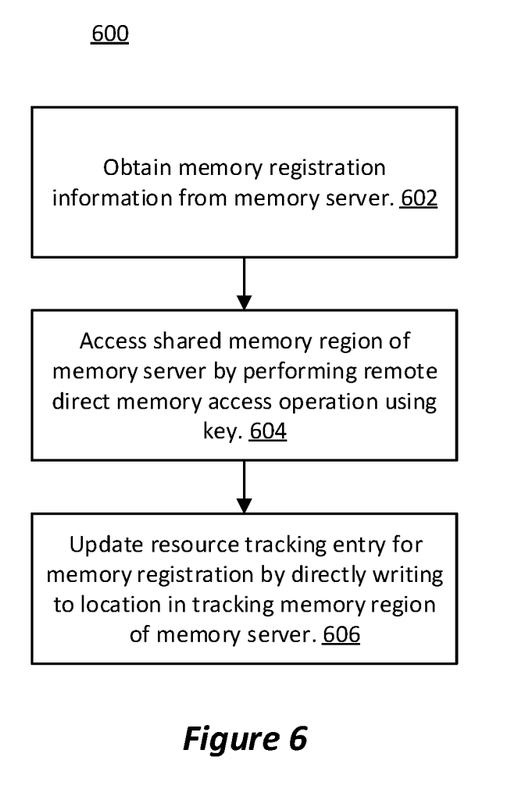
FIG. 6 is a block diagram of a memory registration method for a compute node, according to some implementations.

FIG. 6 is a block diagram of a memory registration method 600, according to some implementations. The memory registration method 600 may be performed by a compute node in a remote memory system.

The compute node may perform a step 602 of obtaining memory registration information from a memory server, the memory registration information comprising a key for a memory registration of a shared memory region of the memory server, the memory registration information further comprising a location of a resource tracking entry for the memory registration, the location of the resource tracking entry comprising a location within a tracking memory region of the memory server. The resource tracking entry may comprise a status of the memory registration and a global reference count for the memory registration. The resource tracking entry may comprise a binary word, a first portion of the binary word indicating the status of the memory registration, a second portion of the binary word indicating the global reference count for the memory registration.

Obtaining the memory registration information may comprise: searching a local resource cache of the compute node for the memory registration information; requesting the memory registration information from the memory server in response to the memory registration information being unavailable in the local resource cache; and (optionally) taking the memory registration information from the local resource cache in response to the memory registration information being available in the local resource cache. Requesting the memory registration information from the memory server may comprise sending a remote procedure call request to the memory server.

The compute node may perform a step 604 of accessing the shared memory region of the memory server by performing a remote direct memory access operation using the key.

The compute node may perform a step 606 of updating the resource tracking entry for the memory registration by directly writing to the location within the tracking memory region of the memory server. Writing to the location within the tracking memory region of the memory server may include performing an atomic compare-and-exchange operation at the location within the tracking memory region of the memory server. When the resource tracking entry comprises a binary word, updating the resource tracking entry for the memory registration may comprise overwriting the binary word.

Additional steps (not separately illustrated) may be performed by the compute node. For example, the compute node may perform a step of decrementing a local reference count for the memory registration at the compute node, wherein the resource tracking entry for the memory registration is updated in response to the local reference count being zero.

Figure 7:
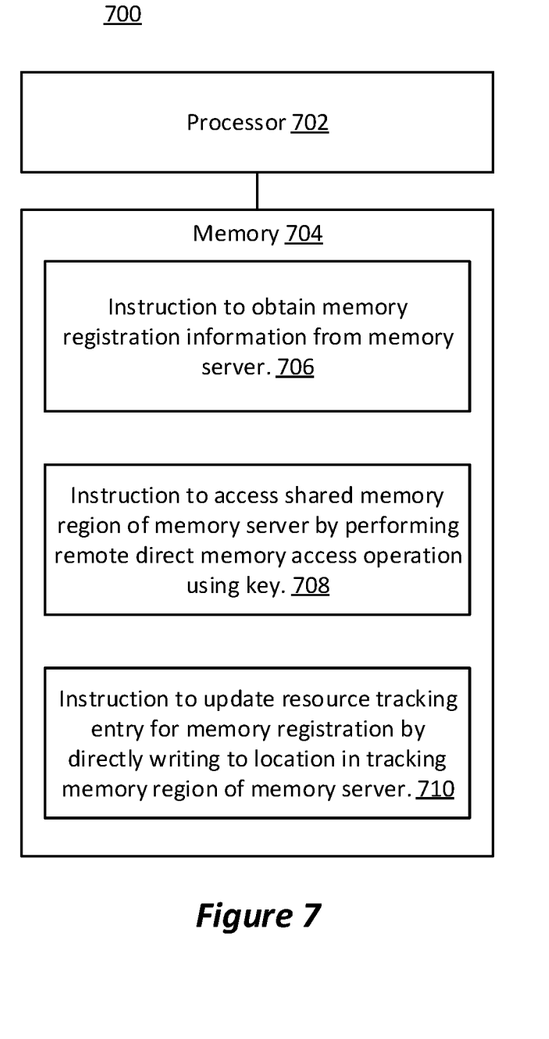
FIG. 7 is a block diagram of a compute node, according to some implementations.

FIG. 7 is a block diagram of a compute node 700, according to some implementations. The compute node 700 may include a processor 702 and a memory 704. The memory 704 may be a non-transitory computer readable medium that stores programming for execution by the processor 702. In this implementation, one or more modules within the compute node 700 may be partially or wholly embodied as software for performing any functionality described herein. For example, the memory 704 may include: instructions 706 for obtaining memory registration information from a memory server, the memory registration information comprising a key for a memory registration of a shared memory region of the memory server, the memory registration information further comprising a location of a resource tracking entry for the memory registration, the location of the resource tracking entry comprising a location within a tracking memory region of the memory server; instructions 708 for accessing the shared memory region of the memory server by performing a remote direct memory access operation using the key; and instructions 710 for updating the resource tracking entry for the memory registration by directly writing to the location within the tracking memory region of the memory server.

Figure 8:
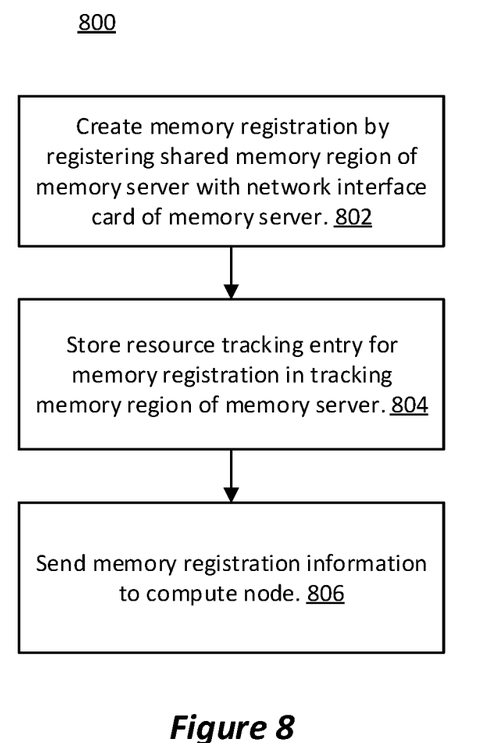
FIG. 8 is a block diagram of a memory registration method for a memory server, according to some implementations.

FIG. 8 is a block diagram of a memory registration method 800, according to some implementations. The memory registration method 800 may be performed by a memory server in a remote memory system.

The memory server may perform a step 802 of creating a memory registration by registering a shared memory region of the memory server with a network interface card of the memory server. The shared memory region may be a region of a volatile memory. The shared memory region may be a region of a non-volatile memory.

The memory server may perform a step 804 of storing a resource tracking entry for the memory registration in a tracking memory region of the memory server. The resource tracking entry may comprise a status of the memory registration and a global reference count for the memory registration. The resource tracking entry may comprise a binary word, a first portion of the binary word indicating the status of the memory registration, a second portion of the binary word indicating the global reference count for the memory registration.

The memory server may perform a step 806 of sending memory registration information to a compute node, the memory registration information comprising a key for the memory registration and a location of the resource tracking entry, the location of the resource tracking entry comprising a location within the tracking memory region of the memory server.

Additional steps (not separately illustrated) may be performed by the memory server. The memory server may perform a step of unregistering the shared memory region from the network interface card in response to the status of the memory registration being ready-to-release. The memory server may perform a step of, after the unregistering of the shared memory region, deallocating memory for the resource tracking entry. The resource tracking entry may be moved to a garbage collector queue for deallocation. The unregistering of the shared memory region may be performed in the background of the memory server.

Figure 9:
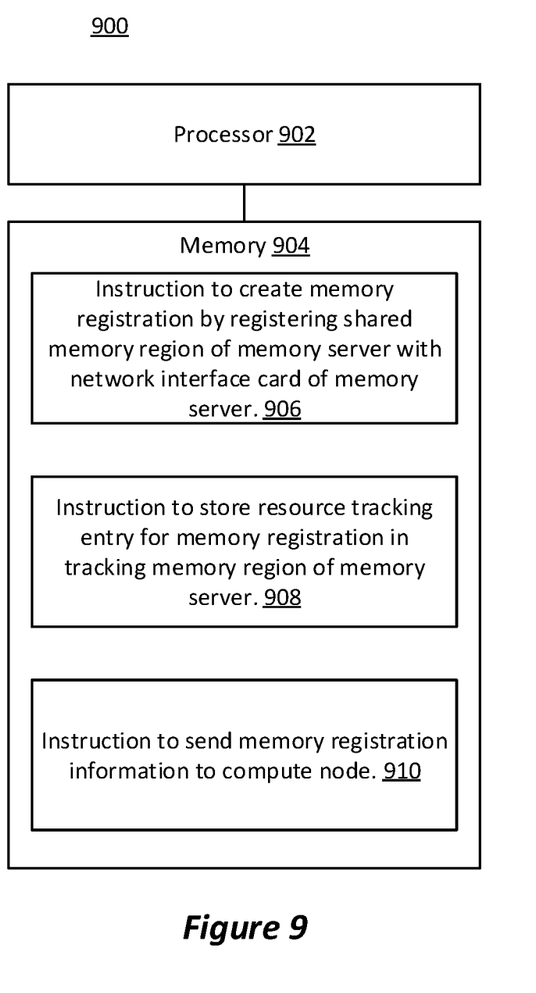
FIG. 9 is a block diagram of a memory server, according to some implementations.

FIG. 9 is a block diagram of a memory server 900, according to some implementations. The memory server 900 may include a processor 902 and a memory 904. The memory 904 may be a non-transitory computer readable medium that stores programming for execution by the processor 902. In this implementation, one or more modules within the memory server 900 may be partially or wholly embodied as software for performing any functionality described herein. For example, the memory 904 may include: instructions 906 for creating a memory registration by registering a shared memory region of the memory server with a network interface card of the memory server; instructions 908 for storing a resource tracking entry for the memory registration in a tracking memory region of the memory server; and instructions 910 for sending memory registration information to a compute node, the memory registration information comprising a key for the memory registration and a location of the resource tracking entry, the location of the resource tracking entry comprising a location within the tracking memory region of the memory server.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A method, by a compute node, the method comprising:
    obtaining memory registration information from a memory server, the memory registration information comprising a key for a memory registration of a shared memory region of the memory server, the memory registration information further comprising a location of a resource tracking entry for the memory registration, the location of the resource tracking entry comprising a location within a tracking memory region of the memory server;
    accessing the shared memory region of the memory server by performing a remote direct memory access operation using the key; and
    updating the resource tracking entry for the memory registration by directly writing to the location within the tracking memory region of the memory server.

2. The method of claim 1, wherein writing to the location within the tracking memory region of the memory server comprises performing an atomic compare-and-exchange operation at the location within the tracking memory region of the memory server.

3. The method of claim 1, wherein the resource tracking entry comprises a status of the memory registration and a global reference count for the memory registration.

4. The method of claim 3, wherein the resource tracking entry comprises a binary word, a first portion of the binary word indicating the status of the memory registration, a second portion of the binary word indicating the global reference count for the memory registration.

5. The method of claim 4, wherein updating the resource tracking entry for the memory registration comprises overwriting the binary word.

6. The method of claim 1, further comprising:
    decrementing a local reference count for the memory registration at the compute node, wherein the resource tracking entry for the memory registration is updated in response to the local reference count being zero.

7. The method of claim 1, wherein obtaining the memory registration information comprises:
    searching a local resource cache of the compute node for the memory registration information; and
    requesting the memory registration information from the memory server in response to the memory registration information being unavailable in the local resource cache.

8. The method of claim 7, wherein obtaining the memory registration information further comprises:
    taking the memory registration information from the local resource cache in response to the memory registration information being available in the local resource cache.

9. The method of claim 7, wherein requesting the memory registration information from the memory server comprises sending a remote procedure call request to the memory server.

10. A method, by a memory server, the method comprising:
    creating a memory registration by registering a shared memory region of the memory server with a network interface card of the memory server;
    storing a resource tracking entry for the memory registration in a tracking memory region of the memory server; and
    sending memory registration information to a compute node, the memory registration information comprising a key for the memory registration and a location of the resource tracking entry, the location of the resource tracking entry comprising a location within the tracking memory region of the memory server.

11. The method of claim 10, wherein the resource tracking entry comprises a status of the memory registration and a global reference count for the memory registration.

12. The method of claim 11, wherein the resource tracking entry comprises a binary word, a first portion of the binary word indicating the status of the memory registration, a second portion of the binary word indicating the global reference count for the memory registration.

13. The method of claim 11, further comprising:
    unregistering the shared memory region from the network interface card in response to the status of the memory registration being ready-to-release.

14. The method of claim 13, further comprising:
    after the unregistering of the shared memory region, deallocating memory for the resource tracking entry.

15. The method of claim 13, wherein the unregistering of the shared memory region is performed in the background of the memory server.

16. The method of claim 10, wherein the shared memory region is a region of a volatile memory.

17. The method of claim 10, wherein the shared memory region is a region of a non-volatile memory.

18. A system comprising:
    a memory server configured to:
        create a memory registration of a shared memory region of the memory server;
        store a resource tracking entry for the memory registration in a tracking memory region of the memory server; and
        create memory registration information comprising a key for the memory registration and a location of the resource tracking entry, the location of the resource tracking entry comprising a location within the tracking memory region of the memory server; and
    a compute node configured to:
        obtain the memory registration information from the memory server;
        access the shared memory region of the memory server by performing a remote direct memory access operation using the key; and update the resource tracking entry for the memory registration by directly writing to the location within the tracking memory region of the memory server.

19. The system of claim 18, wherein the resource tracking entry comprises a binary word, a first portion of the binary word indicating a status of the memory registration, a second portion of the binary word indicating a global reference count for the memory registration.

20. The system of claim 19, wherein the memory server is further configured to:
   after the compute node updates the resource tracking entry, unregister the shared memory region; and
   move the resource tracking entry to a garbage collector queue.

\* \* \* \* \*